(12) United States Patent
Balkau (10) Patent No.: US 7,059,239 B2
(45) Date of Patent: Jun. 13, 2006

(54) BREWING DEVICE FOR A COFFEE MAKER

(75) Inventor: Werner Balkau, Schwanden (CH)

(73) Assignee: Red Roses S.A. (LU)

( * ) Notice: Subject to any disclaimer, the term of this patent is extended or adjusted under 35 U.S.C. 154(b) by 23 days.

(21) Appl. No.: 11/044,372

(22) Filed: Jan. 27, 2005

(65) Prior Publication Data

US 2005/0160919 A1 Jul. 28, 2005

(30) Foreign Application Priority Data

Jan. 28, 2004 (DE) .................... 10 2004 004 314

(51) Int. Cl.
*A47J 31/40* (2006.01)
(52) U.S. Cl. ..................... 99/295; 99/302 R
(58) Field of Classification Search .................. 99/279, 99/287, 289 R, 289 D, 295–302 P, 289 P; 426/433
See application file for complete search history.

(56) References Cited

U.S. PATENT DOCUMENTS

| | | | | |
|---|---|---|---|---|
| 5,638,741 A | * | 6/1997 | Cisaria | 99/295 |
| 5,794,519 A | * | 8/1998 | Fischer | 99/295 |
| 6,698,332 B1 | * | 3/2004 | Kollep et al. | 99/289 R |
| 6,820,535 B1 | * | 11/2004 | Fischer | 99/289 R |
| 2002/0144603 A1 | | 10/2002 | Taylor | |
| 2003/0056655 A1 | * | 3/2003 | Kollep et al. | 99/295 |

FOREIGN PATENT DOCUMENTS

| | | |
|---|---|---|
| DE | 196 47 039 | 7/1997 |
| EP | 0 838 185 | 4/1998 |
| EP | 1 183 975 | 3/2002 |
| EP | 1 319 357 | 6/2003 |

* cited by examiner

*Primary Examiner*—Timothy F. Simone
(74) *Attorney, Agent, or Firm*—Maginot, Moore & Beck (57) ABSTRACT

The brewing device comprises a brewing chamber constituted by an upper and a lower brewing chamber portion. The lower brewing chamber portion includes a chamber for receiving the coffee powder portion, and the upper brewing chamber portion includes a closure element for closing the chamber in the lower brewing chamber portion. The upper brewing chamber portion comprises an inner element provided with the closure element, and an outer element coaxially disposed and axially movable with regard to the inner element. The lower brewing chamber portion is adapted to be fixed to the outer element of the upper brewing chamber portion. The outer element of the upper portion comprises a pivotal operating lever connected to the inner element of the upper brewing chamber portion by an actuating member disposed eccentrically to the axis of rotation of the lever to cause an axial relative movement between the inner element and the outer element of the upper brewing chamber portion upon pivoting the operating lever.

16 Claims, 4 Drawing Sheets

BREWING DEVICE FOR A COFFEE MAKER

BACKGROUND OF THE INVENTION

The present invention refers to a brewing device for a coffee maker, comprising a brewing chamber adapted to receive a coffee powder portion and constituted by an upper brewing chamber portion and a lower brewing chamber portion. The lower brewing chamber portion includes a chamber for receiving the coffee powder portion, and the upper brewing chamber portion includes a closure element adapted to close the chamber in the lower brewing chamber portion.

Such brewing devices are used both in manually operated coffee makers and in fully automatic coffee makers. The manually operated coffee makers usually comprise a coffee powder holder that can be attached to the coffee maker by means of a bayonet fixing. Thereby, two types of coffee powder holders are in common use: First, coffee powder holders adapted to receive the loose coffee powder, and second, coffee powder holders adapted to receive a coffee powder cartridge. For piercing of such coffee powder cartridges, the brewing head of the coffee maker may comprise a grating whose exposed front surface is provided with a plurality of acute projections. These projections penetrate the cover of the coffee powder cartridge once the holder with cartridge is inserted into the coffee maker. For piercing the bottom of the coffee powder cartridge, the bottom of the cartridge holder is provided with acute projections as well. As soon as pressurized brewing water is fed into the interior of the coffee powder cartridge, the bottom of the cartridge is pressed against these acute projections under the influence of the hydraulic pressure in the cartridge and the bottom of the cartridge is pierced. Such a coffee maker is disclosed, for example, in the document EP 0,521,187.

Moreover, brewing heads for coffee makers are known in which no cartridge or coffee powder holder in the above mentioned sense is provided; rather, the two brewing head portions are pivotable in relation to each other.

PRIOR ART

The German patent document DE 94 15 374 U1 discloses a brewing head for coffee powder cartridges in an espresso machine. It comprises a lower brewing head portion and an upper brewing head portion pivotally connected to the lower brewing head portion. The two portions together form a receptacle for a coffee powder cartridge. The upper brewing head portion is provided with a hot water channel, branching out to several hollow needles that serve for piercing the foil cover of the cartridge. In the lower brewing head portion, truncated pyramid shaped elements are provided adapted to penetrate the lower part of the coffee powder cartridge as soon as the latter one is pressurized by the brewing water and pressed against these truncated pyramid shaped elements. For opening and closing the cartridge receptacle constituted by the upper and lower brewing head portions, a lever is provided which also may operate an ejector for the used cartridge.

The patent document EP 0 528 757 discloses a brewing device preferably to be used in conjunction with a fully automatic espresso machine. The brewing device comprises a brewing cylinder with a cylindrical bore, in which a lower piston is disposed freely moveable and longitudinally displaceable. An upper piston is rigidly connected to a frame. Parallel to the vertically disposed brewing cylinder there is a drive spindle, which has guide means. A drive element connected to the brewing cylinder has further guide means, which engage with those of the drive spindle. By rotating the drive spindle in one or the other direction, the brewing cylinder is displaced upwards or downwards. Through a pivotable hopper, the coffee powder is filled into the brewing cylinder. In order to establish the quantity of coffee powder inserted, the brewing cylinder is displaced upwards under time control at least until a counter force created by the upper piston via the pressed coffee powder is equivalent to the drive force of the spindle In order to permit the preferred loose brewing of the coffee powder, the brewing chamber between the two pistons is slightly enlarged again prior to the actual brewing process.

The patent document EP 1 090 574 A1 discloses a device for extracting a substance for the preparation of a drink. This device includes a first, fixed piece and a second piece that is movable relative to the first about an axis of rotation lying at the rear of the two pieces, with the front of each piece providing a cavity for the substance to be extracted. The device also includes a system for closing and opening the two pieces. This system possesses a two-armed closing lever and two traction rods. The two arms of the closing lever are arranged to rotate about a first pivot on each side of the second piece. The traction rods are arranged to rotate about a second pivot on each side of the first piece. The ends of the two arms of the closing lever and the traction rods are fixed by means of a third, movable pivot so as to interact mutually in order to cause the closing and opening of the device.

The patent document EP 0 838 185 A1 discloses an espresso coffee machine comprising a conventional filter holder provided with a handle. For attaching the filter holder to a boiler, an annular intermediate member is provided. The top of this intermediate member comprises two projections located opposite to each other and gradually increasing in height, forming a bayonet fixture together with projections provided on the boiler. The bottom of the intermediate member comprises a front and a rear aperture having U-like shape. Between these two apertures, two lateral parallel webs extend in which prismatic grooves are machined and which serve for receiving the filter holder. The filter holder can be laterally inserted into and removed from the intermediate member. By rotating the filter holder received in the intermediate member, an axial displacement of the filter holder with regard to the boiler and, thereby, a closing of the chamber in the filter holder can be achieved.

The patent document US 2002/144,603 discloses a coffee maker for extracting coffee powder received in a coffee powder cartridge. The coffee maker is provided with a brewing head, the brewing chamber thereof being laterally movable for inserting and removing a coffee powder cartridge. A first piercing member is located in the lower brewing chamber portion, adapted to eccentrically pierce the cartridge. A second, tube-shaped piercing member is located at the top of the brewing chamber; it is fixed to a swiveling arm and connected to a boiler via a flexible hose. The arm is supported on a round plate by means of a bolt. Below that plate, an inflatable bladder is disposed which can be inflated by means of an air pump in order to press the arm upwards. By activating the air pump and inflating the bladder, causing a movement of the arm, first, the cartridge is pierced at its bottom and then at its top be means of a tubular piercing member. Thereafter, the brewing water is fed via the flexible hose into the tubular piercing member to extract the coffee powder received in the cartridge.

The patent document DE 196 47 039 A1 discloses a coffee maker comprising a brewing head, which heats the water and is guided up and down in guide columns in a housing.

A holder for the ground coffee can be moved horizontally from the brewing position underneath the brewing head into a filling position when the brewing head is moved upwards. The ground coffee holder is a filter pan for a filter or filter bag for the pressure-less production of the filter coffee. A screen holder for ground espresso coffee can be placed in the filter bag to produce espresso coffee under pressure.

The patent document EP 1 319 357 A1 discloses a device for producing foam in the filter of espresso coffee machines. It has a container that receives the ground coffee and a filter element in its bottom held within a filter support with outlets for the coffee beverage. Below the container is a body with a chamber in which a screw is screwed. The chamber has upper and lower connections and the screw acts on a sprung sphere so that the amount of foam generated can be adjusted.

Finally, the patent document EP 1 183 975 A1 discloses a coffee machine for brewing coffee powder pre-packed in a cartridge, whereby the bottom of the brewing chamber receiving the cartridge is provided with piercing members to perforate the cartridge bottom upon closing the brewing chamber. A brewing chamber housing contains an upper and a lower brewing chamber portion together delimiting the brewing chamber and axially movable relative to each other. The upper brewing chamber portion is biased by a spring to move away from the lower brewing chamber portion and provided with a protection member that bars access to the perforator members if the upper brewing chamber member is in its upper rest position. The upper brewing chamber member is moved, together with the protection member, from an upper into a lower operating position in which the piercing member provides the bottom of the cartridge with elongate slots.

OBJECTS OF THE INVENTION

It is an object of the present invention to provide a brewing device for a coffee maker which comprises only a few moving parts, which is of simple and compact design and which is easy to operate.

SUMMARY OF THE INVENTION

In order to meet these and other objects, the present invention provides a brewing device for a coffee maker, comprising a brewing chamber adapted to receive a coffee powder portion and constituted by an upper brewing chamber portion and a lower brewing chamber portion. The lower brewing chamber portion includes a chamber for receiving the coffee powder portion, and the upper brewing chamber portion includes a closure element adapted to close the chamber in the lower brewing chamber portion. The upper brewing chamber portion comprises an inner element provided with the closure element, and an outer element coaxially disposed and axially movable with regard to the inner element. The lower brewing chamber portion is adapted to be fixed to the outer element of the upper brewing chamber portion.

The outer element of the upper brewing chamber portion comprises an operating lever pivotally fixed thereto, which is connected to the inner element of the upper brewing chamber portion by an actuating member disposed eccentrically to the axis of rotation of the operating lever to cause an axial relative movement between the inner element and the outer element of the upper brewing chamber portion upon pivoting the operating lever.

BRIEF DESCRIPTION OF THE DRAWINGS

In the following, an embodiment of the brewing device for a coffee maker according to the invention will be further described, with reference to the accompanying drawings, in which.

DETAILED DESCRIPTION OF A PREFERRED EMBODIMENT

Figure 1:
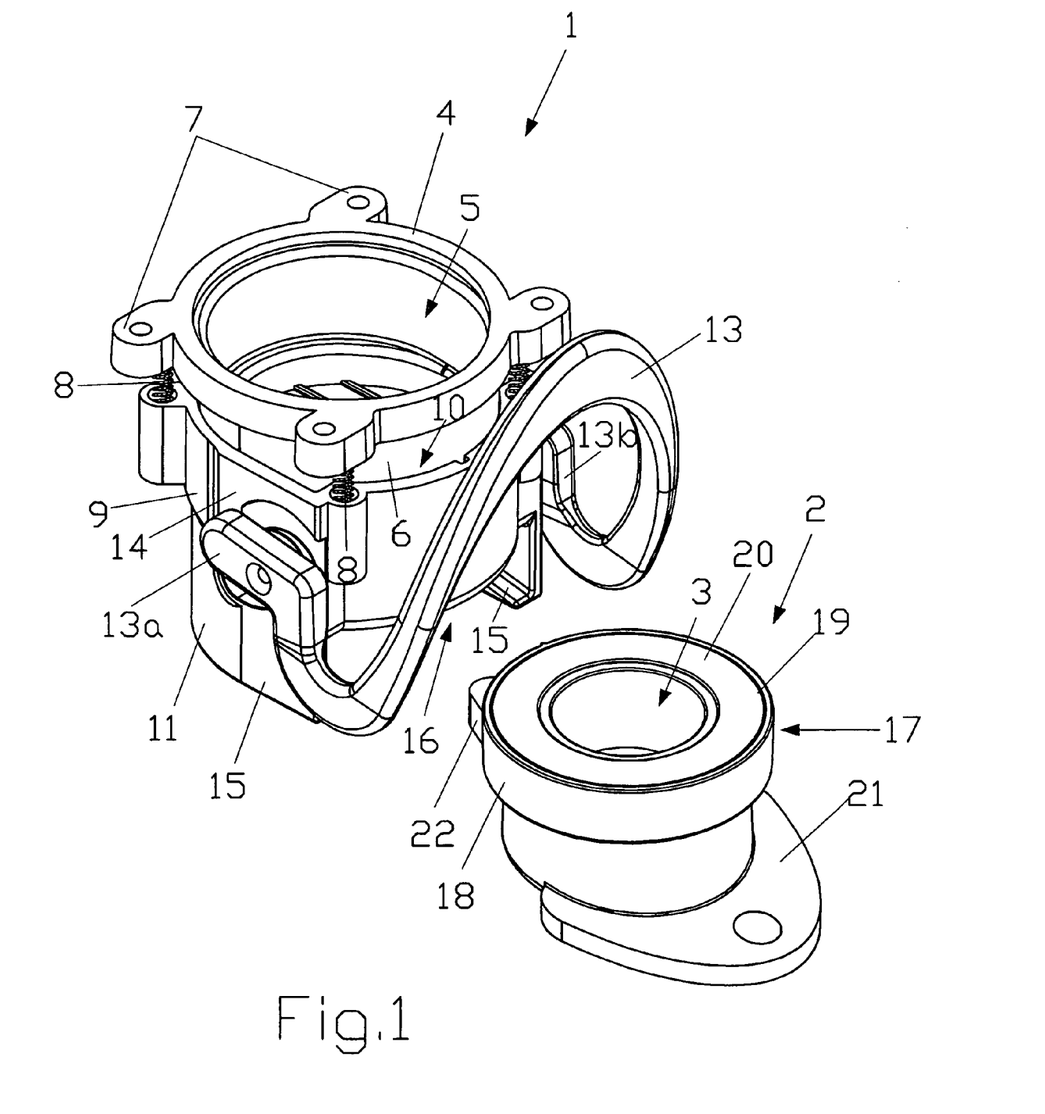
FIG. 1 shows a perspective view of a brewing device comprising an upper brewing chamber portion and a lower brewing chamber portion.

FIG. 1 shows a perspective view of a brewing device for a coffee maker. The brewing device comprises an upper brewing chamber portion 1 and a lower brewing chamber portion 2, together constituting a brewing chamber adapted to receive a coffee powder portion, be it in loose powder form, be it a packaged cartridge of coffee powder.

The upper brewing chamber portion comprises an inner element 4 and an outer element 9, the inner and the outer element 4, 9 being in coaxial relationship and movable relative to each other, whereby springs 8 are inserted between the inner 4 and the outer element 9, as will be further explained herein after. Both the inner element 4 and the outer element 9 are of essentially hollow cylindrical shape, whereby both elements 4, 9 are provided with enlarged upper portions 5, 10 having greater diameters than the lower portions of the elements 4 and 9, respectively. The enlarged portions 5, 10 are at least partially laterally delimited by wall portions 6 and 11, respectively.

The inner element 4 is provided with a connection flange 7, having four holes by means of which it is firmly attached to the coffee maker (not shown). Moreover, the upper portion 1 of the brewing chamber is provided with an operating lever 13, having bracket- or yoke-like shape and by means of which the inner element 4 can be moved relative to the outer element 9. The one lateral portion of the lever 13 is designated by reference numeral 13a and the other lateral portion of the lever 13 is designated by reference numeral 13b. The outer element 9 is provided with flattened lateral portions 14 to which the operating lever 13 is rotatably connected. Further details regarding the operating lever and the parts and elements operatively connected thereto will be further discussed herein after.

The bottom of the outer element 9 of the upper portion 1 of the brewing chamber is provided with guide rails 15, having a lateral insertion opening 16 for insertion and removal of the lower portion 2 of the brewing chamber. Thereby, these guide rails 15 serve for fixing the lower portion 2 of the brewing chamber to the outer element 9 of the upper portion 1 of the brewing chamber. The springs 8 serve for biasing the outer element 9 downwards into the end position shown in FIG. 1, i.e. the "open" position in which the lower portion 2 of the brewing chamber can be removed from and attached to, respectively, the upper portion 1 of the brewing chamber.

The lower portion 2 of the brewing chamber is provided with a chamber 3 adapted to receive a portion of coffee powder. Thereby, as already mentioned, it is not essential whether loose coffee powder or a coffee powder cartridge is inserted into the chamber 3. However, in the present example, it is assumed that the chamber 3 is adapted to receive a coffee powder cartridge (not shown).

The lower portion 2 of the brewing chamber comprises a base portion 17 and a cartridge receptacle 19 resiliently supported therein. The interior of the cartridge receptacle 19 is adapted to receive a coffee powder cartridge and comprises an upper annular face portion 20 on which a closure element 28 rests, being part of the upper portion 1 of the brewing chamber, when the chamber 3 is closed. The top of the base portion 17 is provided with a flange 18 by means of which the lower portion 2 of the brewing chamber is fixed to the guide rails 15 of the outer element 9 of the upper portion 1 of the brewing chamber. Moreover, the base portion 17 is provided with a flat handle 21.

In the illustration shown in FIG. 1, the lower portion of the brewing chamber is laterally displaced with regard to the upper portion 1 of the brewing chamber. In this position, a coffee powder portion can be inserted into the chamber 3 or a used coffee powder portion can be removed from the chamber 3.

Figure 2:
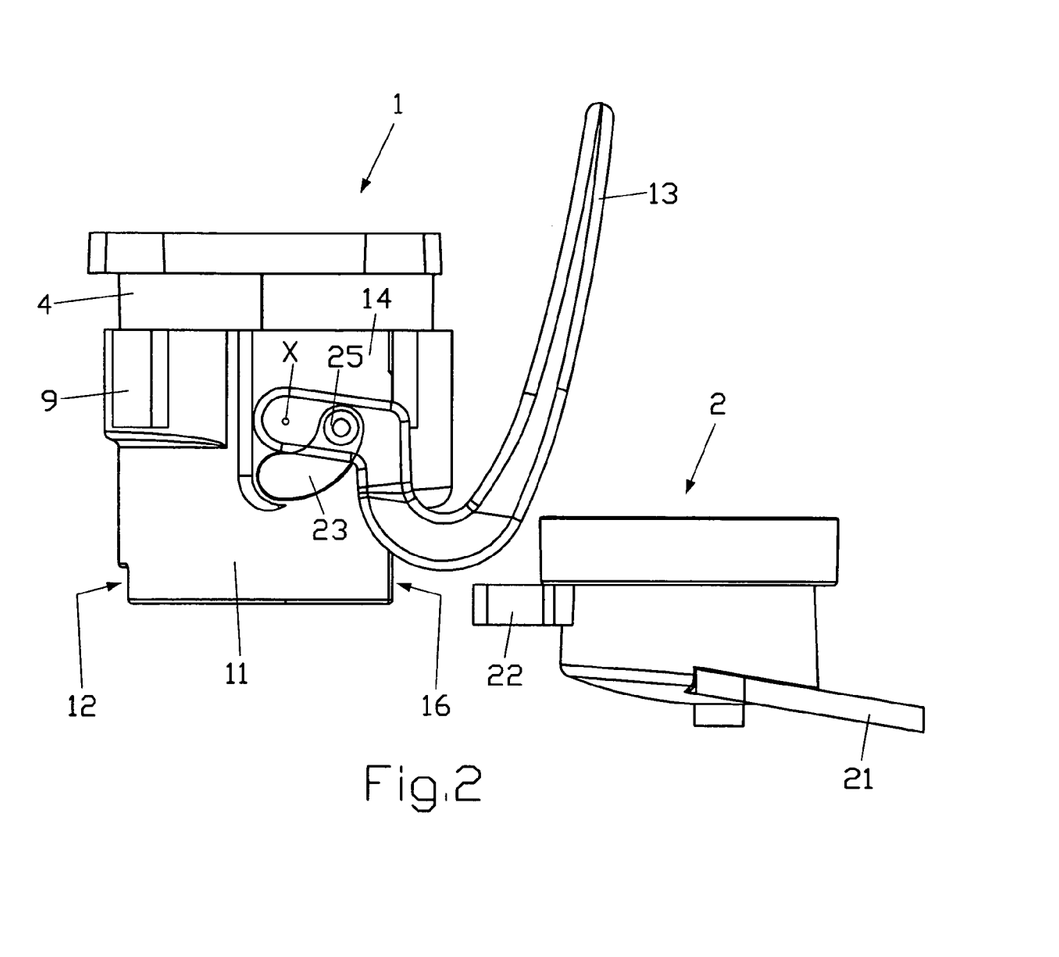
FIG. 2 shows a side view of the upper brewing chamber portion and the lower brewing chamber portion.

FIG. 2 shows a side view of the upper portion 1 and the lower portion 2 of the brewing chamber according to FIG. 1. As can be clearly seen in that illustration, the wall portion 11 of the outer element 9 is provided with a slot-shaped recess 12 located opposite the lateral insertion opening 16, while the lower portion 2 of the brewing chamber is provided with a guide cam 22, conically narrowing towards its end. This guide cam 22 serves for centering the lower portion 2 of the brewing chamber upon fixing it to the outer element 9 of the upper portion 1 of the brewing chamber by adjusting itself on the lateral walls of the slot-shaped recess 12.

The operating lever 13 is fixed to the outer element 9 of the upper portion 1 of the brewing chamber, whereby it is pivotable around an axis X. Into each of the two flattened portions 14 of the outer element 9, a groove 23 is machined, forming arcuate guide links having their centers on the aforementioned axis X, being also the axis of rotation of the lever 13. Connected to the two lateral portions 13a, 13b of the operating lever (FIG. 1) is a shaft 25, extending through both the outer element 9 and the inner element 4 and by means of which a relative movement between inner element 4 and outer element 9 is effected upon pivoting the operating lever 13. The two grooves 23 are designed such that the shaft 25 can freely move within the grooves 23 upon pivoting the lever 13. In order to ensure that the shaft 25 can extend also through the inner element 4, the walls thereof are provided with corresponding grooves, too, which, however, are not visible in this illustration.

Figure 3:
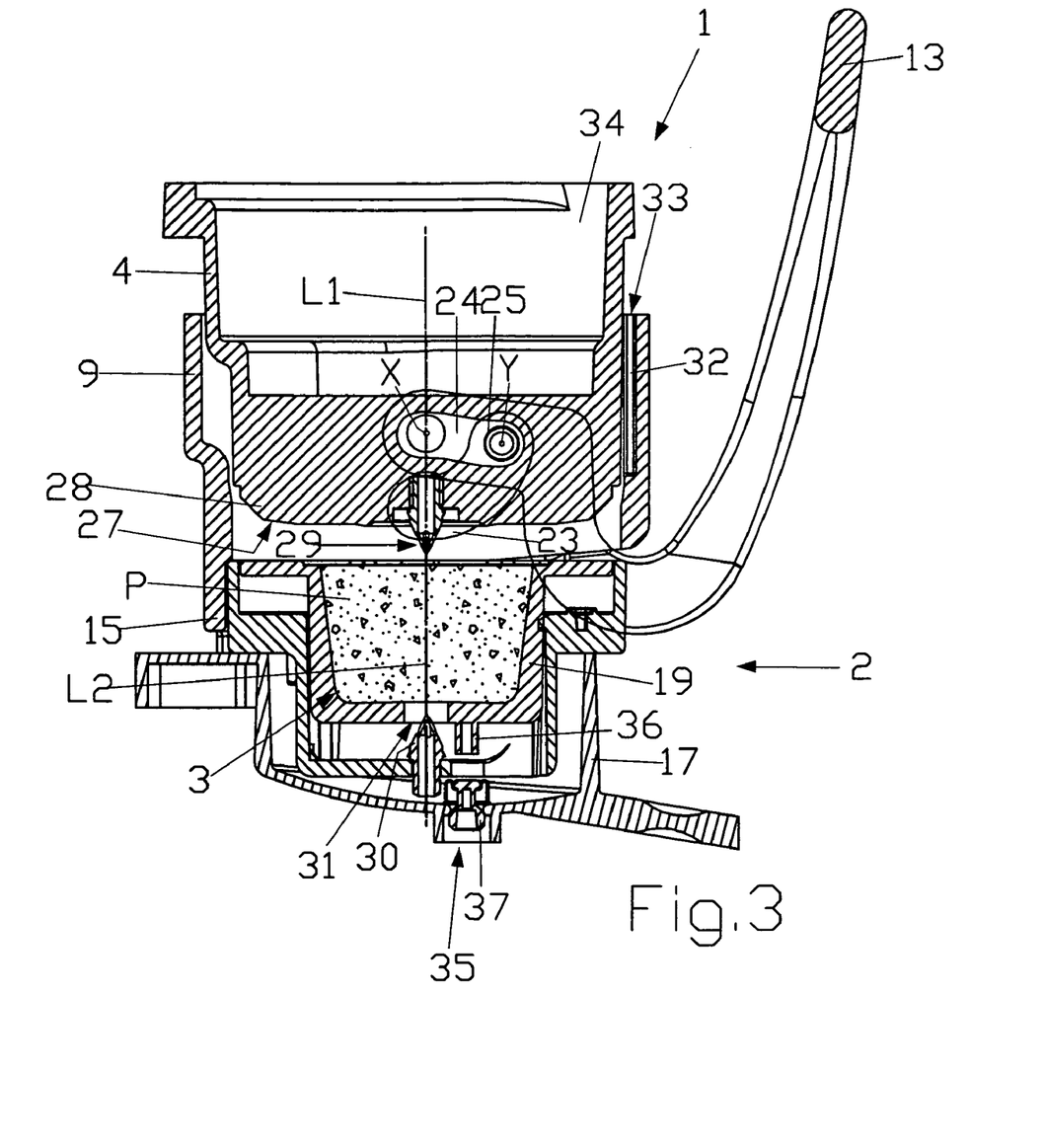
FIG. 3 shows a first longitudinal sectional view of the brewing device according to FIG. 1.

FIG. 3 shows a longitudinal sectional view of the upper portion 1 of the brewing chamber and of the lower portion 2 of the brewing chamber fixed to the outer element 9 of the upper portion 1 of the brewing chamber. The cartridge receptacle 19 is provided with a cartridge P filled with coffee powder. The bottom side 27 of the inner element 4 of the upper portion 1 of the brewing chamber, facing the lower portion 2 of the brewing chamber, is designed as a closure element 28. It is adapted to rest on the annular face portion 20 (FIG. 1) to sealingly close the cartridge receptacle 19. Protruding from the bottom side 27 of the closure element 28, there is an upper piercing member 29, serving for piercing the cover of the coffee powder cartridge. At the bottom of the base portion 17, there is provided a lower piercing member 30, serving for piercing the bottom of the coffee powder cartridge. For this purpose, the cartridge receptacle 19 comprises an aperture 31 through which the lower piercing member 30 can extend into the interior of the cartridge receptacle 19 once the brewing chamber is closed. The bottom of the base portion 17 is provided with a beverage outlet 35 through which the brewed coffee beverage can flow out. In the interior of this beverage outlet 35, a spring biased valve member 37 is located that seals the beverage outlet 35 in the position of the brewing device shown in FIG. 3, thus preventing a flowing out or dripping of possibly present residual water or coffee beverage. For actuating the spring loaded valve member 37, a pin 36 is provided, protruding from the outside of the bottom of the cartridge receptacle 19. This pin 36 opens the valve member 37 once the chamber 3 is closed and the closure element 28 presses the cartridge receptacle 19 downwards.

Two opposite lateral wall portions of the inner element 4 of the upper portion 1 of the brewing chamber are provided each with an essentially horizontally extending groove 24; it is understood that the illustration of FIG. 3 shows only one of the grooves 24. The shaft 25, non-positively fixed to the operating lever 13 at point Y, extends through the arcuate grooves 23 as well as through the essentially horizontal grooves 24. Resulting from this design, a pivoting of the operating lever 13 causes a relative movement of the inner element 4 with regard to the outer element 9 of the upper portion 1 of the brewing chamber. Upon rotating the operating lever 13 downwards, the shaft 25 rests non-positively on the wall of the groove 24 and draws the inner element 4 downwards relative to the outer element 9. If the inner element 4 is fixedly connected to the coffee maker, the lower element 9 is moved upwards in axial direction, i.e. in the direction of the central longitudinal axis L1, relative to the inner element 4 upon rotating the operating lever 13 downwards. By this mechanism, the force is essentially centrally transmitted from operating lever 13 via the shaft 25 to the inner element 4, i.e. within a plane intersecting the longitudinal central axis L1. The groove 24 delimits the pivotal movement of the operating lever 13 and, thereby, serves as an end stop member. The amount of the relative movement between the inner element 4 and the outer element 9, i.e. the stroke caused by pivoting the operating lever 13, is chosen such that both the cover and the bottom of the coffee powder cartridge P are reliably pierced by the two piercing members 29 and 30 upon closing the chamber 3.

For closing the chamber 3 and for piercing the coffee powder cartridge P, only a relatively short stroke is required. This fact has the advantage that the force to be manually exerted by the operator to pivot the operating lever 13 is relatively small, too. The entire mechanism is designed such that the force contact point Y of the shaft 25 wanders from one side of the rotation axis X to the other side during pivoting the operating lever 13 downwards. In other words and as seen in the illustration of FIG. 3, upon operating the lever 13, the force contact point Y of the shaft 25 wanders from the right side of the axis of rotation X, coinciding with the longitudinal axis L1, and being approximately 5° beyond the dead center, to the left side of the axis of rotation X. Such a design has the advantage that the operating lever 13 takes a locked position in the closed state of the brewing chamber, i.e. the lever 13 being in its fully clockwise position. Thus, any danger is avoided that the forces created by the hydraulic pressure in the brewing chamber and acting on the closure element 28 and thereby on the lower portion 2 of the brewing chamber cause an upward movement of the operating lever 13.

If the inner element 4 is firmly fixed to the coffee maker, as suggested herein before, a pivoting movement of the operating lever 13 in downwards direction causes a displacement of the outer element 9 relative to the inner element 4 in an upwards direction, while a pivoting movement of the operating lever 13 in upwards direction causes a displacement of the outer element 9 relative to the inner element 4 in an downwards direction. In order to prevent the inner element 4 to rotate with regard to the outer element 9, the inner element 4 is provided with a projection 32 extending into a groove 33 provided in the wall of the outer element 9.

In the situation shown in the drawings, the lower portion 2 of the brewing chamber being fixed to the upper portion 1 of the brewing chamber by means of its outer element 9, the longitudinal axis L1 of the upper portion 1 of the brewing chamber and the closure element 28, respectively, coincide with the longitudinal axis L2 of the lower portion 2 of the brewing chamber, i.e. the two portions are coaxial to each other. Upon closing the chamber 3, both a relative movement of the inner element 4 with regards to the outer element 9, as well as a relative movement of the lower portion 2 of the brewing chamber with regards to the inner element 4 incorporating the closure element 28 takes place along the extension of these longitudinal axes L1, L2. The two piercing elements 29, 30 are also located in the region of these two longitudinal axes L1, L2. Finally, also the axis of rotation X of the operating lever 13 intersects the longitudinal axes L1, L2.

The inner element 4 of the upper portion 1 of the brewing chamber is provided with an integrated, symbolically illustrated boiler 34. An integral boiler 34 has the advantage, on the one hand, that no connection hoses or tubings have to be provided between closure element 28 and boiler 34, and on the other hand, that the closure element 28 is preheated by the boiler and the brewing water, respectively.

Figure 4:
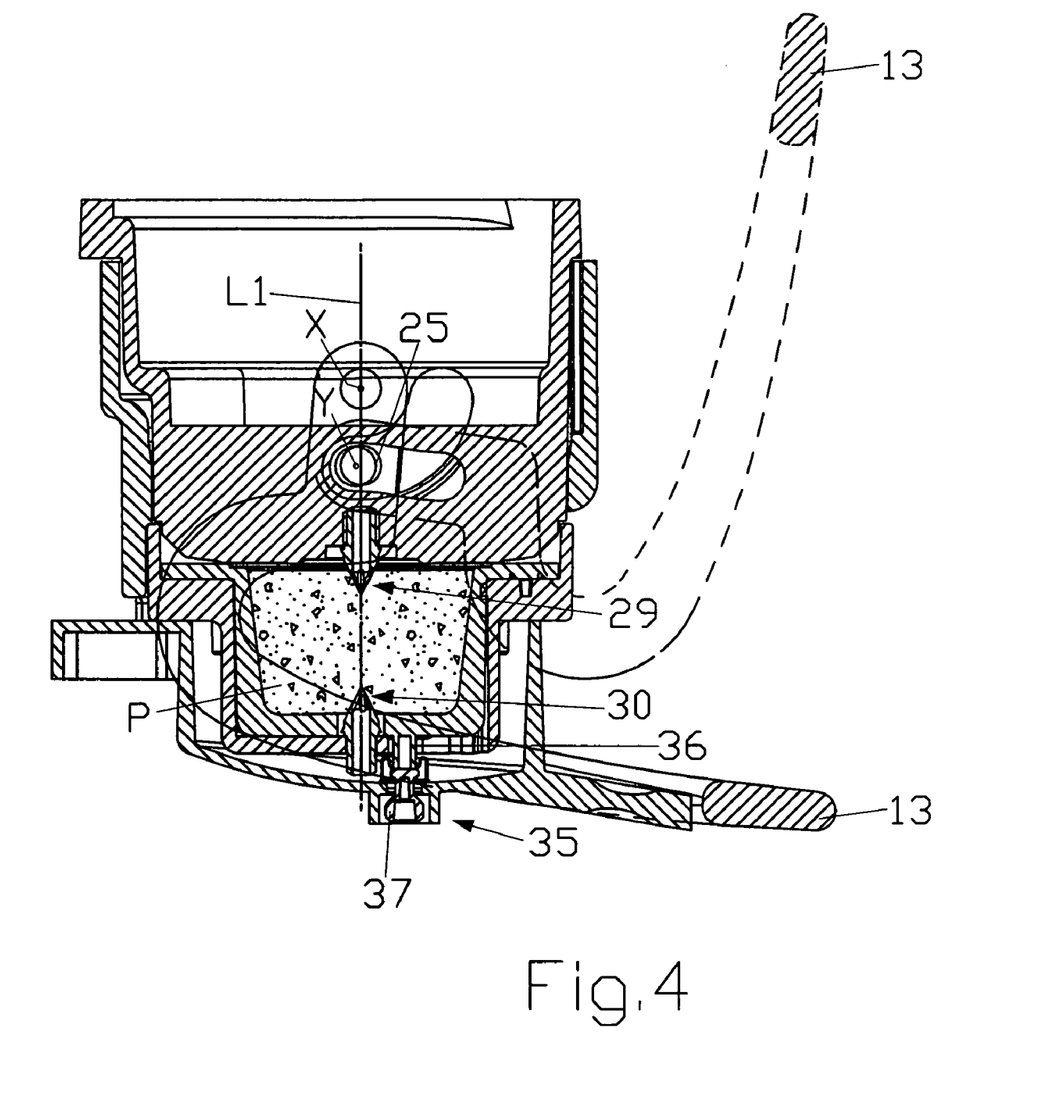
FIG. 4 shows a second longitudinal sectional view of the brewing device according to FIG. 1.

In order to get from the open position shown in FIG. 3 to the closed position shown in FIG. 4, the operating lever 13 has to be moved into its lowermost position, whereby the outer element 9, together with the lower portion 2 of the brewing chamber fixed thereto, is moved upwards along the longitudinal axis L1. In FIG. 4, it is particularly evident that force contact point Y of the shaft 25 has moved, in the closed position of the operating lever 13, beyond the dead center to the left side of the axis of rotation X. Due to the upwardly directed movement of the lower portion 2 of the brewing chamber, on the one hand, the cover of the coffee powder cartridge P is pierced by means of the upper piercing member 29. On the other hand, the closure element 28 comes to a rest on the annular face portion 20 of the cartridge receptacle 19, with the result that the latter one, together with the coffee powder cartridge received therein, is moved downwards. Thereby, the lower piercing member 30 penetrates the aperture 31 provided in the bottom of the cartridge receptacle 19 and pierces the bottom of the coffee powder cartridge P. Once the chamber 3 is fully closed by the closure element 28, the chamber 3 constitutes the real brewing chamber.

During the subsequent brewing operation, brewing water is fed into the interior of the coffee powder cartridge through the upper piercing member 29. The brewed coffee beverage can escape from the coffee powder cartridge P through the lower piercing member 30 and flow out of the brewing device through the open valve member 37 and the beverage outlet 35.

Instead of the manually operated lever 13, of course, an electric motor driven mechanism could be used.

The advantages of the brewing device according to the invention can be summed up as follows:

Simple and compact design; particularly low overall height.

Simple and reliable piercing of the coffee powder cartridge received in the chamber 3, without the need of performing a rotational movement between the lower portion of the brewing chamber and the upper portion of the brewing chamber.

By providing the lower portion of the brewing chamber with a coffee portion when it is laterally removed from the upper portion of the brewing chamber, only a relatively short stroke is required for closing the brewing chamber. Equally, a relatively short stroke suffices for piercing the cartridge.

The suggested mechanism is of simple design, uses relatively few moving parts and can be manufactured at low costs.

After closing the brewing chamber, the operating lever is in a self-locking position.

The forces transmitted by the lever mechanism are transmitted centrally, i.e. in the region of the longitudinal axis of the brewing chamber portions.

By the parallel movement and the central transmittal of forces, a reliable sealing of the brewing chamber is achieved.

Due to the longitudinally movable cartridge receptacle, the lower piercing member is received in the base portion of the lower portion of the brewing chamber and, thereby, protected from unintentional touching.

Due to the design of the brewing device, as explained herein before, and due to the closure element fixedly implemented in the coffee maker, the entire machine can be built in a very compact manner. Moreover, the brewing device consists but of a low number of elements, resulting in a high reliability and a low final price.

What is claimed is:

1. Brewing device for a coffee maker, comprising:
 a brewing chamber adapted to receive a coffee powder portion and constituted by an upper brewing chamber portion and a lower brewing chamber portion;
 said lower brewing chamber portion including a chamber for receiving said coffee powder portion, and said upper brewing chamber portion including a closure element adapted to close said chamber in said lower brewing chamber portion;
 said upper brewing chamber portion comprising an inner element provided with said closure element, and an outer element coaxially disposed and axially movable with regard to said inner element;
 said lower brewing chamber portion being adapted to be fixed to said outer element of said upper brewing chamber portion;
 said outer element of said upper brewing chamber portion comprising an operating lever pivotally fixed thereto;
 said operating lever being operationally connected to said inner element of said upper brewing chamber portion by an actuating member disposed eccentrically to the axis of rotation of said operating lever to cause an axial relative movement between said inner element and said outer element of said upper brewing chamber portion upon pivoting said operating lever.

2. Brewing device according to claim 1 in which said actuating member is arranged on said operating lever such that the force contact point of the actuating member on the operating lever wanders from one side of the axis of rotation of the operating lever to the other side of the axis of rotation of the operating lever once the operating lever is pivoted from an open position to a closed position, said operating lever taking a self-locking position in the closed state of the brewing device.

3. Brewing device according to claim 1 in which the bottom of said outer element is provided with means for attaching said lower brewing chamber portion.

4. Brewing device according to claim 3 in which said means for attaching said lower brewing chamber portion include guide rails, provided with a lateral aperture for inserting and removal of said lower brewing chamber portion.

5. Brewing device according to claim 4 in which said outer element is supported by means of springs on said inner element such that the springs bias said outer element to take a lower open position in which said lower brewing chamber portion can be attached to and removed from, respectively, said outer element.

6. Brewing device according to claim 1 in which said inner element is provided with means for fixing it to a coffee maker.

7. Brewing device according to claim 1 in which both said outer element and said inner element are provided with a portion having enlarged diameter, at least partially laterally delimited by a wall portion.

8. Brewing device according to claim 7 in which said wall portion of said outer element is provided with two arcuate grooves located opposite to each other and extending coaxially to the axis of rotation of said operating lever, and in which said wall portion of said inner element is provided with two essentially horizontally extending grooves located opposite to each other, whereby said actuating member is constituted by a shaft member fixed to said operating lever and extending both through said grooves provided in said outer element and said grooves provided in said inner element.

9. Brewing device according to claim 8 in which said wall portion of said outer element is provided with two flattened portion portions located opposite to each other in which said grooves are provided and and to which said operating lever is pivotally attached.

10. Brewing device according to claim 1 in which said lower brewing chamber portion comprises a base element and a cartridge receptacle resiliently supported on said base portion, whereby said base portion is provided with a flange member corresponding in shape to said guide rail, and whereby said cartridge receptacle is moved into said base portion by said closure element upon closing said chamber.

11. Brewing device according to claims 4 and 10 in which said wall portion of said outer element is provided with a recess opposite to said lateral aperture, and in which said base portion is provided with a conically shaped guide cam member by means of which said base portion is aligned around the longitudinal axis upon inserting said lower brewing chamber portion into said guide rails.

12. Brewing device according to claim 11 in which said base portion is provided with a handle located opposite said guide cam member.

13. Brewing device according to claim 10 in which the bottom of said closure element and the bottom of said base portion both are provided with at least on piercing member for piercing a coffee powder cartridge, whereby said cartridge receptacle is provided with an aperture through which said piercing member provided on the bottom of said base portion extends into the interior of said cartridge receptacle upon cleaning said chamber.

14. Brewing device according to claim 1 in which said lower brewing chamber portion is provided with a beverage outlet in which is provided a spring biased valve member adapted to close said beverage outlet when said chamber is not closed.

15. Brewing device according to claim 14 in which said closure element is provided with a pin member arranged corresponding to said beverage outlet and which transfers said valve member into its open state upon closing said chamber.

16. Brewing device according to claim 1 in which said upper brewing chamber portion is provided with an integral boiler.

* * * * *

UNITED STATES PATENT AND TRADEMARK OFFICE
CERTIFICATE OF CORRECTION

PATENT NO. : 7,059,239 B2  
APPLICATION NO. : 11/044372  
DATED : June 13, 2006  
INVENTOR(S) : Ballkau Page 1 of 1

It is certified that error appears in the above-identified patent and that said Letters Patent is hereby corrected as shown below:

In the Specification:
(Column 2, line 61): replace "be" with --by--

In the Claims:
Claim 9, line 3: remove "portion"

Claim 9, line 4: remove one "and"

Claim 13, line 3: replace "on" with --one--

Signed and Sealed this

Fifth Day of December, 2006

JON W. DUDAS  
*Director of the United States Patent and Trademark Office*